Patented July 9, 1946

2,403,710

UNITED STATES PATENT OFFICE 2,403,710

2-BROMPYRAZINE AND METHOD OF PREPARING SAME

James K. Dixon, Riverside, and John M. Sayward, Stamford, Conn., assignors to American Cyanamid Company, New York, N. Y., a corporation of Maine No Drawing. Application July 21, 1944, Serial No. 546,052

6 Claims. (Cl. 260—239.6)

The present invention relates to a new chemical compound, 2-brompyrazine and to a method of preparing the same.

We have discovered that 2-brompyrazine can be prepared by heating together an acid salt of pyrazine and bromine at temperatures up to about 250° C. The formation of mono-brompyrazine in this process involves, we believe, the preliminary formation of a perbromide at relatively low temperatures, room temperatures up to about 100° C., followed by rearrangement at higher temperatures to the corresponding acid salt of 2-brompyrazine. The pure 2-brompyrazine may then be recovered by methods known to those skilled in the art. The formation of 2-brompyrazine by our new process may be illustrated in the following equations:

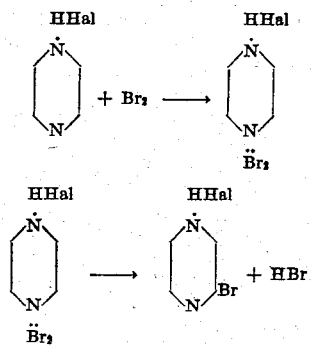

The compound 2-brompyrazine (mono-brompyrazine) is useful as an intermediate in the preparation of 2-aminopyrazine and in the preparation of 2-sulfanilamidopyrazine. It will react with para-acetylaminobenzenesulfonamide directly to give 2 - p - acetylaminobenzenesulfonamidopyrazine, whereas the corresponding 2-chlorpyrazine does not react to any great extent.

In carrying out our invention, pyrazine hydrochloride or pyrazine hydrobromide is treated at ordinary room temperatures with 50 to 100% of the theoretical amount of bromine, thereby forming perbromide. The perbromide is then heated to at least 100° C. for about one to six hours. Under these conditions rearrangement occurs whereby the pyrazine ring is brominated, releasing hydrogen bromide, and any solvent present is distilled off. The distillation system is then put under a vacuum and the temperature maintained at 200° C. to about 250° C. for one half to about 4 hours, during which time 2-brompyrazine distills from the reaction mass and crystals of brompyrazine hydrochloride, or brompyrazine hydrobromide, as the case may be, are collected in the cooler parts of the apparatus. Upon the addition of water to the crystalline distillate, 2-brompyrazine separates as an oil.

It is desirable, but not necessary, to have present at the time of reaction an inert solvent such as carbon tetrachloride. Some of the advantages of a solvent are that it aids in eliminating caking of the pyrazine salt, makes the reaction run smoother, and permits increasing the bromine usage to nearly 100% of theoretical without increasing decomposition. The solvents which we can use in our process should have a boiling point below that of brompyrazine and include such inert solvents as carbon tetrachloride, chloroform, dioxane, benzene, and the like.

The pyrazine acid salt found best suited for use in our process is pyrazine hydrochloride, which may be obtained by bubbling hydrogen chloride through a solution of pyrazine in an organic solvent. Pyrazine hydrochloride comes down as a nearly-white, fluffy precipitate which can be separated by filtration. Other pyrazine acid salts such as pyrazine hydrobromide may, of course, be used.

The preparation of 2-brompyrazine in accordance with our invention will now be illustrated by means of the following specific examples, which, it is understood, are given by way of illustration and are not intended to limit our process to the particular reactants and reaction conditions described therein.

Example 1

Into a 125 cc. stirred flask was placed 18 g. of pyrazine hydrochloride (80% pure=0.124 mol). Bromine 10.6 g. (0.066 mol) was added to the solid pyrazine slowly at about 50° C., liberating heat. The temperature was then raised to 150° C.–165° C. for 1 hour, and then to 190° C. for 1 hour. At this point vacuum was applied, through a side tube and traps. White-to-yellow crystals appeared in the traps while the reaction flask was kept at 200°–215° C. for about 1.5 hours. The product, crude monobrompyrazine, separated as an oil upon addition of water. Distillation of water and benzene from the product gave an oil which was identified as brompyrazine.

Example 2

21.2 g. (0.132 mol) of bromine was added to 20.9 g. (80% pure—0.143 mol) of pyrazine hydrochloride dissolved in 116 g. of carbon tetrachloride. Bromine addition was discontinued after a half hour, when the charge began to darken (temperature about 32° C.). Upon heating, hydrogen bromide came off at 70 to 80° C. Carbon tetrachloride was distilled off near 100° C. After one hour crystals began to appear in the condenser tubing (bath 110° C.). At 154° C. carbon tetrachloride was all distilled off and hydrogen bromide evolution increased temporarily. During 1.3 hours the bath was raised to 216° C. and more crystals appeared. After 20 minutes at 216° C. a vacuum was applied for 25 minutes; considerable fog was carried through the traps. An oil, crude mono-brompyrazine, separated from the water used to rinse the tubing and traps. To prove the structure of the compound as 2-brompyrazine, it was reacted with alcoholic ammonia and gave a product which compared favorably with known sample of 2-aminopyrazine. Chemical tests were employed to demonstrate the presence of bromine and absence of chlorine, as compared with 2-chlorpyrazine as a control.

We claim:
1. 2-brompyrazine.
2. A method of preparing 2-brompyrazine which comprises adding bromine and an inert solvent to a halogen acid salt of pyrazine of the group consisting of pyrazine hydrochloride and pyrazine hydrobromide and heating the mixture to a temperature at which 2-brompyrazine is distilled.
3. A method of preparing 2-brompyrazine which comprises mixing together bromine, an inert solvent and a halogen acid salt of pyrazine of the group consisting of pyrazine hydrochloride and pyrazine hydrobromide and heating the mixture at a temperature up to about 250° C.
4. A method of preparing 2-brompyrazine which comprises mixing together pyrazine hydrochloride and bromine and heating the mixture to a temperature at which 2-brompyrazine is distilled.
5. A method of preparing 2-brompyrazine which comprises the steps of adding bromine to a solution of pyrazine hydrobromide dissolved in an inert solvent, thereafter raising the temperature of the reaction mixture to distill off the inert solvent and continuing the heating under vacuum and recovering therefrom 2-brompyrazine hydrobromide.
6. A method of preparing 2-brompyrazine which comprises adding pyrazine hydrochloride to a mixture of bromine and an inert solvent and thereafter heating the mixture at a temperature up to about 250° C. for a period of from about one hour to ten hours whereby 2-brompyrazine is formed and recovered as 2-brompyrazine hydrochloride.

JAMES K. DIXON.
JOHN M. SAYWARD.